(12) United States Patent
Ren et al.

(10) Patent No.: US 10,972,171 B2
(45) Date of Patent: Apr. 6, 2021

(54) DATA TRANSMISSION METHOD AND APPARATUS

(71) Applicant: Huawei Technologies Co., Ltd., Shenzhen (CN)

(72) Inventors: Haibao Ren, Shanghai (CN); Ting Wang, Shanghai (CN); Na Deng, Shenzhen (CN); Yuanjie Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/148,759

(22) Filed: Oct. 1, 2018

(65) Prior Publication Data

US 2019/0036589 A1 Jan. 31, 2019

Related U.S. Application Data

(63) Continuation of application No. PCT/CN2017/079074, filed on Mar. 31, 2017.

(30) Foreign Application Priority Data

Mar. 31, 2016 (CN) .......................... 201610201028.0

(51) Int. Cl.
*H04B 7/08* (2006.01)
*H04W 72/04* (2009.01)
*H04L 25/02* (2006.01)

(52) U.S. Cl.
CPC ....... *H04B 7/0802* (2013.01); *H04L 25/0204* (2013.01); *H04W 72/04* (2013.01)

(58) Field of Classification Search
CPC ..... H04L 5/0048; H04L 5/0053; H04L 5/001; H04L 5/0051; H04L 5/0023; H04L 5/005;
(Continued)

(56) References Cited

U.S. PATENT DOCUMENTS 9,008,585 B2 4/2015 Xiao et al.
9,143,207 B2 9/2015 Kim et al.
(Continued)

FOREIGN PATENT DOCUMENTS

CN 101686080 A 3/2010
CN 102164372 A 8/2011
(Continued)

OTHER PUBLICATIONS

"Remaining issues on quasi co-location between CSI-RS, CRS and DMRS," 3GPP TSG-RAN WG1#70bis meeting, San Diego, USA, R1-124558, XP050662440, pp. 1-5, 3rd Generation Partnership Project, Valbonne, France (Oct. 8-12, 2012).
(Continued)

*Primary Examiner* — Ajibola A Akinyemi
(74) *Attorney, Agent, or Firm* — Leydig, Voit & Mayer, Ltd.

(57) ABSTRACT

A data transmission method and apparatus are provided. A terminal device obtains an antenna port allocation result indicating a first antenna port set and a second antenna port set. An antenna port in the first antenna port set is quasi co-located (QCL) with another antenna port in the first antenna port set, an antenna port in the second antenna port is QCL with another antenna port in the second antenna port set, and an antenna port in the first antenna port set is not QCL with an antenna port in the second antenna port set. The terminal device receives first data transmitted on an antenna port in the first antenna port set, and receives second data transmitted on an antenna port in the second antenna port set.

18 Claims, 2 Drawing Sheets

(58) Field of Classification Search
CPC ... H04L 5/0007; H04L 5/0091; H04L 5/0035; H04L 5/00; H04L 5/0055; H04L 27/2607; H04L 27/2613; H04L 1/0026; H04L 27/2602; H04L 27/2692
USPC ....................................................... 455/277.1
See application file for complete search history.

(56) References Cited

U.S. PATENT DOCUMENTS

| | | | |
|---|---|---|---|
| 9,893,853 | B2 | 2/2018 | Yi et al. |
| 9,923,684 | B2 | 3/2018 | Ng et al. |
| 2010/0322176 | A1 | 12/2010 | Chen et al. |
| 2013/0039203 | A1 | 2/2013 | Fong et al. |
| 2013/0155968 | A1 | 6/2013 | Pelletier et al. |
| 2013/0301434 | A1 | 11/2013 | Krishnamurthy et al. |
| 2013/0343299 | A1 | 12/2013 | Sayana et al. |
| 2014/0133395 | A1 | 5/2014 | Nam et al. |
| 2014/0185495 | A1 | 7/2014 | Kuchibhotla et al. |
| 2014/0192732 | A1 | 7/2014 | Chen et al. |
| 2014/0192734 | A1 | 7/2014 | Ng et al. |
| 2014/0198763 | A1 | 7/2014 | Sorrentino et al. |
| 2014/0241454 | A1 | 8/2014 | Kim et al. |
| 2015/0063234 | A1 | 3/2015 | Park et al. |
| 2015/0131560 | A1 | 5/2015 | Von Elbwart et al. |
| 2015/0189626 | A1 | 7/2015 | Zhu |
| 2015/0215093 | A1* | 7/2015 | Kim .................. H04L 5/0053 370/329 |
| 2015/0249517 | A1 | 9/2015 | Seo et al. |
| 2015/0280877 | A1* | 10/2015 | Chen .................. H04W 24/10 370/252 |
| 2015/0289235 | A1 | 10/2015 | Park et al. |
| 2015/0304997 | A1 | 10/2015 | Park et al. |
| 2015/0341099 | A1 | 11/2015 | Kang et al. |
| 2015/0341877 | A1 | 11/2015 | Yi et al. |
| 2015/0365152 | A1* | 12/2015 | Frenne ............... G03G 15/0812 370/252 |
| 2015/0382376 | A1 | 12/2015 | Tanaka |
| 2016/0036571 | A1 | 2/2016 | Park et al. |
| 2016/0119947 | A1 | 4/2016 | Park et al. |
| 2016/0157108 | A1 | 6/2016 | Park et al. |
| 2017/0063503 | A1 | 3/2017 | Liu et al. |
| 2017/0223686 | A1 | 8/2017 | You et al. |
| 2017/0237535 | A1 | 8/2017 | Park et al. |
| 2018/0083681 | A1 | 3/2018 | Faxér et al. |
| 2018/0212732 | A1 | 7/2018 | You et al. |
| 2018/0270799 | A1 | 9/2018 | Noh et al. |
| 2019/0386854 | A1* | 12/2019 | Kim .................. H04L 25/02 |

FOREIGN PATENT DOCUMENTS

| | | |
|---|---|---|
| CN | 102170335 A | 8/2011 |
| CN | 103298117 A | 9/2013 |
| CN | 103298118 A | 9/2013 |
| CN | 103298119 A | 9/2013 |
| CN | 104247291 A | 12/2014 |
| CN | 104272833 A | 1/2015 |
| CN | 104919724 A | 9/2015 |
| CN | 105122916 A | 12/2015 |
| CN | 105144612 A | 12/2015 |
| CN | 105432026 A | 3/2016 |
| EP | 2654333 A1 | 10/2013 |
| EP | 2775642 A2 | 9/2014 |
| EP | 2800286 A1 | 11/2014 |
| EP | 2905910 A1 | 8/2015 |
| EP | 2883324 B1 | 10/2016 |
| EP | 2524559 B1 | 11/2016 |
| JP | 2016506690 A | 3/2016 |
| WO | 2009076995 A1 | 6/2009 |
| WO | 2011075908 A1 | 6/2011 |
| WO | 2014010911 A1 | 1/2014 |
| WO | 2014129716 A1 | 8/2014 |
| WO | 2014176034 A1 | 10/2014 |
| WO | 2015037885 A1 | 3/2015 |
| WO | 2015099330 A1 | 7/2015 |
| WO | 2016018079 A1 | 2/2016 |
| WO | 2016021969 A1 | 2/2016 |
| WO | 2017171481 A1 | 10/2017 |

OTHER PUBLICATIONS

"LTE; Evolved Universal Terrestrial Radio Access (E-UTRA); Physical layer procedures, (3GPP TS 36.213 version 12.4.0 Release 12," ETSI TS 136 213 V12.4.0, XP055310306, pp. 1-228, 3rd Generation Partnership Project, Valbonne, France (Feb. 2015).

"Downlink control signaling for CoMP," 3GPP TSG-RAN WG1#68 bis, Jeju, Korea, R1-121395, XP050599682, 3rd Generation Partnership Project, Valbonne, France (Mar. 2012).

"3rd Generation Partnership Project; Technical specification Group Radio Access Network; Evolved Universal Terrestrial Radio Access (E-UTRA); Physical layer procedures (Release 13)," 3GPP TS 36.213 V13.1.1, pp. 1-361, 3rd Generation Partnership Project—Valbonne, France (Mar. 2016).

"3rd Generation Partnership Project; Technical Specification Group Radio Access Network; Evolved Universal Terrestrial Radio Access (E-UTRA); Multiplexing and channel coding (Release 13)," 3GPP TS 36.212 V13.1.0, pp. 1-129, 3rd Generation Partnership Project—Valbonne, France (Mar. 2016).

"3rd Generation Partnership Project; Technical Specification Group Radio Access Network; Evolved Universal Terrestrial Radio Access (E-UTRA); Physical channels and modulation (Release 13)," 3GPP TS 36.211 V13.1.0, pp. 1-155, 3rd Generation Partnership Project—Valbonne, France (Mar. 2016).

"3rd Generation Partnership Project; Technical Specification Group Radio Access Network;Evolved Universal Terrestrial Radio Access Network (E-UTRAN); X2 application protocol (X2AP) (Release 13)," 3GPP TS 36.423 V13.3.0, pp. 1-230, 3rd Generation Partnership Project—Valbonne, France (Mar. 2016).

"3rd Generation Partnership Project; Technical Specification Group Radio Access Network; Evolved Universal Terrestrial Radio Access (E-UTRA); Radio Resource Control (RRC); Protocol specification (Release 13)," 3GPP TS 36.331 V13.1.0, pp. 1-551, 3rd Generation Partnership Project—Valbonne, France (Mar. 2016).

"Downlink Control Signaling for Rel. 11 CoMP", 3GPP TSG RAN WG1 Meeting #71, R1-124839,New Orleans, USA, XP50662822, pp. 1-4, 3rd Generation Partnership Project—Valbonne, France (Nov. 12-16, 2012).

"Rel-14 SID proposal: Further enhancements to CoMP operation," 3GPP TSG RAN Meeting #71, Göteborg, Sweden, RP-160430, pp. 1-5 (Mar. 7-10, 2016).

"New SID: Further enhancements to Coordinated Multi-Point Operation," 3GPP TSG RAN Meeting #71, Göteborg, Sweden, RP-160665, pp. 1-6 (Mar. 7-10, 2016).

"CoMP schemes for non-ideal backhaul and inter-eNodeB signaling," 3GPP TSG RAN WG1 Meeting #74bis, Guangzhou, China, R1-134356, pp. 1-5, 3rd Generation Partnership Project, Valbonne, France, (3GPP server publication date: Sep. 28, 2013) (Oct. 7-11, 2013).

* cited by examiner

DATA TRANSMISSION METHOD AND APPARATUS

CROSS-REFERENCE TO RELATED APPLICATIONS

This application is a continuation of International Application No. PCT/CN2017/079074, filed on Mar. 31, 2017, which claims priority to Chinese Patent Application No. 201610201028.0, filed on Mar. 31, 2016. The disclosures of the aforementioned applications are hereby incorporated by reference in their entireties.

TECHNICAL FIELD

The present disclosure relates to the field of communications technologies, and in particular, to a data transmission method, a network-side device, and a terminal device.

BACKGROUND

A multiple-input multiple-output (MIMO) technology (also referred to as a multi-antenna technology) can use space diversity to improve system reliability, use spatial multiplexing to increase system capacity, and use beamforming to improve cell coverage. Physical-layer basic technologies of a Long Term Evolution (LTE) system includes the MIMO technology.

In an LTE multi-antenna system, different logical ports are defined to distinguish different channels. A user-level reference signal, for example, a demodulation reference signal, is a demodulation-reference signal (DM-RS) in an existing LTE system and is sent by using one or more antenna ports of an antenna port 5, an antenna port 7, an antenna port 8, or antenna ports 7 to 14. Therefore, the antenna ports used to send the DM-RS are also referred to as DM-RS ports. Likewise, data is also sent on different antenna ports, for example, on one or more antenna ports of the antenna port 5, the antenna port 7, or the antenna port 8. The antenna ports used to send the data are also referred to as data ports. A receive end may perform channel estimation and data demodulation by using the DM-RS sent on the antenna port that is the same as the data port.

In the LTE version 10, a new transmission mode is introduced, i.e., transmission mode 9. The transmission mode 9 supports eight antenna ports and multi-user MIMO transmission. To support 8-antenna transmission, a base station needs to indicate, on e.g., a physical downlink control channel (PDCCH) in LTE, a quantity of precoding layers corresponding to data on a physical downlink shared channel (PDSCH) of a user equipment and an antenna port number corresponding to a DM-RS. A terminal device may obtain, by detecting a corresponding indication field in the PDCCH, the quantity of layers and an antenna port corresponding to each layer that are included in the received PDSCH data. The terminal device performs channel estimation by using the DM-RS sent by the antenna port, and then performs PDSCH data demodulation.

To support coordinated multi-point transmission, a concept of an antenna port quasi-colocation (QCL) in an LTE system, is introduced to LTE in the Third Generation Partnership Project (3GPP) version 11. Signals sent from a QCL antenna port encounter same large-scale fading. Large-scale fading includes delay spread, Doppler spread, Doppler shift, an average channel gain, and an average delay. To support the terminal device in receiving downlink control information from a serving base station on the PDCCH and receiving downlink data from a coordinated base station on the PDSCH, a new transmission mode, namely, a transmission mode 10, is defined in the version 11. A physical downlink shared channel resource element mapping and quasi-colocation indicator is mainly introduced in the transmission mode. The physical downlink shared channel resource element mapping and quasi-colocation indicator is abbreviated as PDSCH RE Mapping and QCL Indicator (PQI) in the LTE system and is used to indicate which base station sends downlink data, and which group of antenna ports with which a channel large-scale characteristic corresponding to the downlink data is consistent. Based on the PQI and a PDSCH mapping message element configured by using radio resource control (RRC) signaling, UE may learn about and use a radio channel parameter corresponding to which group of antenna ports to demodulate the downlink data.

The PQI in the LTE version 11 supports only one group of parameters, which means that the PDSCH can only be sent from one group of QCL antenna ports. This limits an application scope of the transmission mode 10. For example, in a distributed MIMO system or a multi-station coordinated transmission system, a single frequency network (SFN) technology (a plurality of antenna ports/a plurality of base stations send same modulation data on a same time-frequency resource) can only be used to combine a plurality of non-QCL antenna ports into an antenna port belonging to a same QCL set, to perform SFN transmission for a single user. For example, two geographically separated antenna ports belong to two QCL sets. To send data to a same terminal device through the two antenna ports in a same time-domain symbol, according to an existing protocol, only the two antenna ports can be virtualized into one combined antenna port, to send the data to the terminal device. The existing protocol does not support that a plurality of antenna ports belonging to different QCL antenna port sets perform basic MIMO transmission, such as multi-stream transmission or transmit diversity transmission for a single user in a same time-domain symbol.

SUMMARY

Embodiments of the present invention provide a data transmission method, a network-side device, and a terminal device, so as to resolve a prior-art technical problem that a plurality of non-quasi-colocation antenna ports cannot jointly serve a single user.

According to a first aspect, an embodiment of the present invention provides a data transmission method, including: sending, by a first network-side device, indication information to a terminal device, where the indication information is used to indicate that the first network-side device and a second network-side device are to jointly send data to the terminal device; and mapping, by the first network-side device, data that needs to be sent by the first network-side device to all or a part of antenna ports in a first antenna port set, and sending the data that is mapped to the all or a part of antenna ports and that needs to be sent by the first network-side device, where the antenna ports in the first antenna port set are not completely same as antenna ports in a second antenna port set used by the second network-side device.

In a solution in this embodiment of the present invention, the first network-side device uses the first antenna port set, the second network-side device uses the second antenna port set, and further the first network-side device sends, to the terminal device, the indication information that is used to indicate joint transmission, so that the terminal device can correctly perform data demodulation. Therefore, the solution in this embodiment of the present invention may support the first network-side device and another network-side device that are not in QCL in jointly transmitting data to the terminal device. Alternatively, in a solution in this embodiment of the present invention, the first network-side device uses the first antenna port set, the second network-side device uses the second antenna port set, further the first network-side device sends first indication information to the terminal device, and the second network-side device sends second indication information to the terminal device. The first indication information is used to indicate antenna port information in the first antenna port set used by the first network-side device and corresponding QCL information. The second indication information is used to indicate antenna port information in the second antenna port set used by the second network-side device and corresponding QCL information. The first indication information and the second indication information may enable the terminal device to determine that the first network-side device and the second network-side device perform joint transmission to the terminal device, so that the terminal device can correctly perform data demodulation. Therefore, the solution in this embodiment of the present invention may support the first network-side device and another network-side device that are not in QCL in jointly transmitting data to the terminal device.

With reference to the first aspect, in a first possible implementation of the first aspect, before the sending, by a first network-side device, indication information to a terminal device, the method further includes: sending, by the first network-side device, an antenna port allocation result to the terminal device, where the antenna port allocation result is used to indicate the first antenna port set and/or the second antenna port set. By using this method, an antenna port set can be dynamically allocated. This is flexible and convenient.

With reference to the first aspect or the first possible implementation of the first aspect, in a second possible implementation of the first aspect, before the sending, by a first network-side device, indication information to a terminal device, the method further includes: sending, by the first network-side device, notification information to the second network-side device, where the notification information is used to notify the second network-side device of the second antenna port set used by the second network-side device or the first antenna port set.

With reference to the first or the second possible implementation of the first aspect, in a third possible implementation of the first aspect, the sending, by the first network-side device, an antenna port allocation result to the terminal device includes: sending, by the first network-side device, the antenna port allocation result to the terminal device by using higher layer signaling.

With reference to the third possible implementation of the first aspect, in a fourth possible implementation of the first aspect, the sending, by the first network-side device, the antenna port allocation result to the terminal device by using higher layer signaling includes: sending, by the first network-side device, the antenna port allocation result to the terminal device by using a physical downlink shared channel mapping and quasi-colocation (QCL) configuration information element in the higher layer signaling.

With reference to any one of the first aspect or the first to the fourth possible implementations of the first aspect, in a fifth possible implementation of the first aspect, the sending, by the first network-side device, data that needs to be sent by the first network-side device to the terminal device by using antenna ports in a first antenna port set includes: mapping, by the first network-side device, a part of a plurality of code words of the data that needs to be jointly transmitted to the antenna ports in the first antenna port set, and sending the part of code words mapped to the antenna ports in the first antenna port set; or mapping, by the first network-side device, a signal of diversity transmitted signals to the antenna ports in the first antenna port set, and sending the signal mapped to the antenna ports.

With reference to any one of the first aspect or the first to the fifth possible implementations of the first aspect, in a sixth possible implementation of the first aspect, the antenna ports in the first antenna port set and the second antenna port set are further configured to transmit demodulation reference signals, and transmit a demodulation reference signal used for demodulating data by using a port that the data to be demodulated is on.

According to a second aspect, an embodiment of the present invention provides a data transmission method, including: obtaining, by a second network-side device, a coordination indication, where the coordination indication is used to indicate that the second network-side device and a first network-side device are to jointly send data to a terminal device; obtaining, by the second network-side device, a pre-obtained second antenna port set, where the second antenna port set includes at least one antenna port, and the at least one antenna port is not completely same as an antenna port in a first antenna port set used by the first network-side device; and mapping, by the second network-side device, data that needs to be sent by the second network-side device to all or a part of the antenna ports in the second antenna port set, and sending the data that is mapped to the all or a part of antenna ports and that needs to be sent by the second network-side device.

With reference to the second aspect, in a first possible implementation of the second aspect, the obtaining, by the second network-side device, a pre-obtained second antenna port set includes: obtaining, by the second network-side device, the second antenna port set received from the first network-side device.

With reference to the second aspect or the first possible implementation of the second aspect, in a second possible implementation of the second aspect, the antenna ports in the first antenna port set and the second antenna port set are further configured to transmit demodulation reference signals, and transmit a demodulation reference signal used for demodulating data by using a port that the data to be demodulated is on.

According to a third aspect, an embodiment of the present invention provides a data transmission method, including: receiving, by a terminal device, indication information sent by a first network-side device, where the indication information is used to indicate that the first network-side device and a second network-side device are to jointly send data to the terminal device; and receiving, by the terminal device according to the indication information, a first part of data sent by the first network-side device and a second part of data sent by the second network-side device.

Optionally, the method further includes: performing, by the terminal device, channel estimation based on a first demodulation reference signal that is sent by a pre-obtained first antenna port used by the first network-side device to send the first part of data, and demodulating the first part of data based on a channel estimation result; and performing channel estimation based on a second demodulation reference signal that is sent by a pre-obtained second antenna port used by the second network-side device to send the second part of data, and demodulating the second part of data based on a channel estimation result; where the first antenna port and the second antenna port are different. It may be understood that, the demodulation reference signal may be a DM-RS in an LTE system, or may be a signal, with another name, that emerges when the system evolves and that implements a similar DM-RS demodulation reference function. For a function of the demodulation reference signal, refer to descriptions in the Background part or a corresponding 3GPP standard.

With reference to the third aspect, in a first possible implementation of the third aspect, the method further includes: receiving, by the terminal device, an antenna port allocation result sent by the first network-side device, where the antenna port allocation result includes a first antenna port set used by the first network-side device and a second antenna port set used by the second network-side device; antenna ports in the first antenna port set are not completely same as antenna ports in the second antenna port set; and the first antenna port is all or a part of the antenna ports in the first antenna port set, and the second antenna port is all or a part of the antenna ports in the second antenna port set; and determining the first demodulation reference signal corresponding to the first antenna port and the second demodulation reference signal corresponding to the second antenna port.

With reference to the third aspect or the first possible implementation of the third aspect, in a second possible implementation of the third aspect, the antenna ports in the first antenna port set and the second antenna port set are further configured to transmit demodulation reference signals, and transmit a demodulation reference signal used for demodulating data by using a port that the data to be demodulated is on. On a terminal device side, transmitting the demodulation reference signal refers to receiving the demodulation reference signal.

According to a fourth aspect, an embodiment of the present invention provides a data transmission method, including: receiving, by a terminal device, first indication information sent by a first network-side device and second indication information sent by a second network-side device, where the first indication information is used to indicate antenna port information of a first antenna port set used by the first network-side device and QCL information corresponding to the antenna port information; the second indication information is used to indicate antenna port information of a second antenna port set used by the second network-side device and QCL information corresponding to the antenna port information; and antenna ports in the first antenna port set are not completely same as antenna ports in the second antenna port set; and receiving, by the terminal device based on the antenna port information of the first antenna port set and the QCL information corresponding to the antenna port information, and the antenna port information of the second antenna port set and the QCL information corresponding to the antenna port information, a first part of data sent by the first network-side device and a second part of data sent by the second network-side device.

The corresponding QCL information refers to that a currently used antenna port and an antenna port sending a resource (or a signal) meet a QCL relationship. The QCL relationship between the currently used antenna port and the antenna port of the corresponding resource is indicated, to help the terminal device perform channel estimation and/or signal demodulation both on a signal sent by the currently used antenna port and the corresponding resource (or signal).

The first indication information and the second indication information may implicitly indicate that the first network-side device and the second network-side device to send data are to the terminal device in a same time-domain symbol. The terminal device determines, based on that the QCL information corresponding to the antenna port information included in the first indication information is different from the QCL information corresponding to the antenna port information included in the second indication information, that the first network-side device and the second network-side device are to send the data to the terminal device in the same time-domain symbol.

With reference to the fourth aspect, in a first possible implementation of the fourth aspect, the method further includes: performing, by the terminal device, channel estimation based on a first demodulation reference signal that is sent by a pre-obtained first antenna port used by the first network-side device to send the first part of data, and demodulating the first part of data based on a channel estimation result; and performing channel estimation based on a second demodulation reference signal that is sent by a pre-obtained second antenna port used by the second network-side device to send the second part of data, and demodulating the second part of data based on a channel estimation result; where the first antenna port and the second antenna port are different, the first antenna port is all or a part of the antenna ports in the first antenna port set, and the second antenna port is all or a part of the antenna ports in the second antenna port set.

With reference to the fourth aspect or the first possible implementation of the fourth aspect, in a second possible implementation of the fourth aspect, the method further includes: determining, by the terminal device based on a correspondence between an antenna port and a demodulation reference signal, the first demodulation reference signal corresponding to the first antenna port and the second demodulation reference signal corresponding to the second antenna port.

According to a fifth aspect, an embodiment of the present invention provides a network-side device, including: a processor, configured to obtain indication information and map data that needs to be sent by the network-side device to all or a part of antenna ports in a first antenna port set, where the indication information is used to indicate that the network-side device and a second network-side device are to jointly send data to a terminal device; and the antenna ports in the first antenna port set are not completely same as antenna ports in a second antenna port set used by the second network-side device; and a transmitter, configured to send the indication information to the terminal device, and send, to the terminal device, the data that is mapped to the all or a part of antenna ports and that needs to be sent by the network-side device.

With reference to the fifth aspect, in a first possible implementation of the fifth aspect, the transmitter is further configured to: before sending the indication information to the terminal device, send an antenna port allocation result to the terminal device, where the antenna port allocation result is used to indicate the first antenna port set and/or the second antenna port set.

With reference to the fifth aspect or the first possible implementation of the fifth aspect, in a second possible implementation of the fifth aspect, the transmitter is further configured to send notification information to the second network-side device, where the notification information is used to notify the second network-side device of the second antenna port set used by the second network-side device or the first antenna port set.

With reference to the first or the second possible implementation of the fifth aspect, in a third possible implementation of the fifth aspect, the transmitter is configured to send the antenna port allocation result to the terminal device by using higher layer signaling.

With reference to the third possible implementation of the fifth aspect, in a fourth possible implementation of the fifth aspect, the transmitter is configured to send the antenna port allocation result to the terminal device by using a physical downlink shared channel mapping and QCL configuration information element in the higher layer signaling.

With reference to any one of the fifth aspect or the first to the fourth possible implementations of the fifth aspect, in a fifth possible implementation of the fifth aspect, the processor is configured to map a part of a plurality of code words of the data that needs to be jointly transmitted to the antenna ports in the first antenna port set, and the transmitter sends the part of code words mapped to the antenna ports in the first antenna port set; or the processor is configured to map a signal of diversity transmitted signals to the antenna ports in the first antenna port set, and the transmitter sends the signal mapped to the antenna ports.

With reference to any one of the fifth aspect or the first to the fifth possible implementations of the fifth aspect, in a sixth possible implementation of the fifth aspect, the antenna ports in the first antenna port set and the second antenna port set are further configured to transmit demodulation reference signals, and transmit a demodulation reference signal used for demodulating data by using a port that the data to be demodulated is on.

In the foregoing possible implementations, the notification information includes an antenna port index item, and a size of the antenna port index item is N bits; if an $i^{th}$ bit is 0, it indicates that an $i^{th}$ antenna port in antenna ports supported by the second network-side device or the first network-side device is not configured; if the $i^{th}$ bit is 1, it indicates that the $i^{th}$ antenna port in the antenna ports supported by the second network-side device or the first network-side device is configured; a value of i is an integer ranging from 0 to N−1, and N is a positive integer.

In the foregoing possible implementations, the indication information includes a physical downlink shared channel resource element mapping and quasi-colocation indicator (PQI), and a field value of the PQI is represented by bits whose quantity is greater than 2.

According to a sixth aspect, an embodiment of the present invention provides a network-side device, including: a receiver, configured to receive a coordination indication, where the coordination indication is used to indicate that the network-side device and a first network-side device are to jointly send data to a terminal device; a processor, configured to map data that needs to be sent by the network-side device to all or a part of antenna ports in a second antenna port set, where the second antenna port set includes at least one antenna port, and the at least one antenna port is not completely same as an antenna port in a first antenna port set used by the first network-side device; and a transmitter, configured to send, to the terminal device, the data that is mapped to the all or a part of antenna ports and that needs to be sent by the network-side device.

With reference to the sixth aspect, in a first possible implementation of the sixth aspect, the processor is configured to receive the second antenna port set from the first network-side device by using the receiver.

With reference to the sixth aspect or the first possible implementation of the sixth aspect, in a second possible implementation of the sixth aspect, the antenna ports in the first antenna port set and the second antenna port set are further configured to transmit demodulation reference signals, and transmit a demodulation reference signal used for demodulating data by using a port that the data to be demodulated is on.

According to a seventh aspect, an embodiment of the present invention provides a terminal device, including: a receiver, configured to receive indication information from a first network-side device, where the indication information is used to indicate that the first network-side device and a second network-side device are to jointly send data to the terminal device; and receive a first part of data sent by the first network-side device and a second part of data sent by the second network-side device; and a processor, configured to process the first part of data and the second part of data according to the indication information.

With reference to the seventh aspect, in a first possible implementation of the seventh aspect, the processor is further configured to perform channel estimation based on a first demodulation reference signal that is sent by a pre-obtained first antenna port used by the first network-side device to send the first part of data, and demodulate the first part of data based on a channel estimation result; and perform channel estimation based on a second demodulation reference signal that is sent by a pre-obtained second antenna port used by the second network-side device to send the second part of data, and demodulate the second part of data based on a channel estimation result; where the first antenna port and the second antenna port are different.

With reference to the seventh aspect or the first possible implementation of the seventh aspect, in a second possible implementation of the seventh aspect, the receiver is further configured to receive an antenna port allocation result sent by the first network-side device, where the antenna port allocation result includes a first antenna port set used by the first network-side device and a second antenna port set used by the second network-side device; antenna ports in the first antenna port set are not completely same as antenna ports in the second antenna port set; and the first antenna port is all or a part of the antenna ports in the first antenna port set, and the second antenna port is all or a part of the antenna ports in the second antenna port set; and the processor is configured to determine, based on a correspondence between an antenna port and a demodulation reference signal, the first demodulation reference signal corresponding to the first antenna port and the second demodulation reference signal corresponding to the second antenna port.

With reference to the seventh aspect or the first or the second possible implementation of the seventh aspect, in a third possible implementation of the seventh aspect, the indication information includes a PQI, and a field value of the PQI is represented by bits whose quantity is greater than 2.

According to an eighth aspect, an embodiment of the present invention provides a terminal device, including: a receiver, configured to receive first indication information sent by a first network-side device and second indication information sent by a second network-side device, where the first indication information is used to indicate antenna port information of a first antenna port set used by the first network-side device and QCL information corresponding to the antenna port information; the second indication information is used to indicate antenna port information of a second antenna port set used by the second network-side device and QCL information corresponding to the antenna port information; and antenna ports in the first antenna port set are not completely same as antenna ports in the second antenna port set; and a processor, configured to receive, based on the antenna port information of the first antenna port set and the QCL information corresponding to the antenna port information, and the antenna port information of the second antenna port set and the QCL information corresponding to the antenna port information, a first part of data sent by the first network-side device and a second part of data sent by the second network-side device.

With reference to the eighth aspect, in a first possible implementation of the eighth aspect, the processor is further configured to perform channel estimation based on a first demodulation reference signal that is sent by a pre-obtained first antenna port used by the first network-side device to send the first part of data, and demodulate the first part of data based on a channel estimation result; and perform channel estimation based on a second demodulation reference signal that is sent by a pre-obtained second antenna port used by the second network-side device to send the second part of data, and demodulate the second part of data based on a channel estimation result; where the first antenna port and the second antenna port are different, the first antenna port is all or a part of the antenna ports in the first antenna port set, and the second antenna port is all or a part of the antenna ports in the second antenna port set.

With reference to the eighth aspect or the first possible implementation of the eighth aspect, in a second possible implementation of the eighth aspect, the processor is further configured to determine, based on a correspondence between an antenna port and a demodulation reference signal, the first demodulation reference signal corresponding to the first antenna port and the second demodulation reference signal corresponding to the second antenna port.

According to a ninth aspect, an embodiment of the present invention provides a data transmission apparatus. The data transmission apparatus includes a function module configured to implement the method according to the first aspect.

According to a tenth aspect, an embodiment of the present invention provides a data transmission apparatus. The data transmission apparatus includes a function module configured to implement the method according to the second aspect.

According to an eleventh aspect, an embodiment of the present invention provides a data transmission apparatus. The data transmission apparatus includes a function module configured to implement the method according to the third aspect.

According to a twelfth aspect, an embodiment of the present invention provides a data transmission apparatus. The data transmission apparatus includes a function module configured to implement the method according to the fourth aspect.

According to a thirteenth aspect, an embodiment of the present invention further provides a computer storage medium. The computer storage medium stores program code, and the program code includes an instruction used to implement any possible implementation of the method according to the first aspect, the second aspect, the third aspect, or the fourth aspect.

In the foregoing possible implementations, jointly sending data to the terminal device includes: sending, by the first network-side device and the second network-side device, the data to the terminal device in a same time-domain symbol; or sending, by the first network-side device and the second network-side device, the data to the terminal device in different time-domain symbols. A manner of the sending, by the first network-side device and the second network-side device, the data to the terminal device in a same time-domain symbol includes but is not limited to a multi-point multi-stream coordinated transmission manner or a multi-point diversity coordinated transmission manner.

DESCRIPTION OF EMBODIMENTS

Figure 1A:
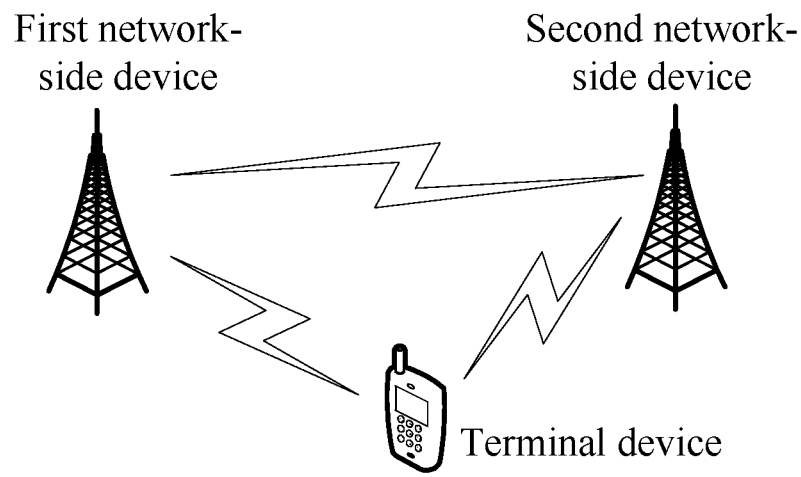
FIG. 1a to FIG. 1b are diagrams of structures of a communications system according to an embodiment of the present invention.

An embodiment of the present invention provides a data transmission method. The method may be applied to a communications network system shown in FIG. 1a and FIG. 1b. In the structure shown in FIG. 1a, the communications network system includes a first network-side device, a second network-side device, and a terminal device. The first network-side device is a serving network-side device of the terminal device. The serving network-side device refers to a network-side device that provides services for the terminal device, such as an RRC connection, non-access stratum (NAS) mobility management, and security input. The first network-side device and the terminal device may communicate by using an air interface protocol. There may be one or more second network-side devices. The second network-side device and the first network-side device are network-side devices that meet different QCLs. The second network-side device and the first network-side device are usually located in different geographical locations. The second network-side device is usually a neighboring network-side device of the first network-side device. The second network-side device may transmit data also by using an air interface protocol. The second network-side device is configured to assist the first network-side device in jointly transmitting data to the terminal device, for example, multi-stream transmission or diversity transmission. Therefore, the second network-side device may also be referred to as a coordinated network-side device. The first network-side device may communicate with the second network-side device, for example, transferring a control message and/or indication information.

During actual application, the first network-side device may be a coordinated network-side device, and the second network-side device is a serving network-side device.

In another aspect, the first network-side device and the second network-side device may be different transmission points of a same device, for example, two remote radio frequency units (RU) or radio frequency heads (RH) in another name, or two completely independent network-side devices, for example, two base stations.

In this application, that the first network-side device and the second network-side device jointly send data to the terminal device includes two meanings. In the first meaning, the first network-side device and the second network-side device send data to the terminal device in a same time-domain symbol. In the second meaning, the first network-side device and the second network-side device send data to the terminal device in different time-domain symbols.

It should be noted that, during coordinated multipoint (CoMP) transmission, it is assumed that radio channels through which the terminal device receives a plurality of antenna port signals have a same large-scale feature, in other words, a plurality of antenna ports belong to a same QCL set. In this way, for two network devices that have different radio channels with the terminal device, if the two network devices send data to the terminal device at the same time, antennas in the two network devices need to be jointly virtualized to form an antenna port that meets a QCL constraint. The two network devices send a demodulation reference signal and data on the antenna port. A joint virtualization method is a single frequency network (SFN) technology, to be specific, a first antenna in an antenna set of the first network-side device and a second antenna in an antenna set of the second network-side device are combined into one antenna port, and data sent on the antenna port is a same modulation symbol sent by the first antenna and the second antenna in a same time-frequency resource.

In the case of the first meaning, in the solutions in this embodiment, an antenna port in a first antenna port set used by the first network-side device is not completely same as an antenna port in a second antenna port set used by the second network-side device. In other words, the first antenna port set belongs to one QCL set, and the second antenna port set belongs to another QCL set, and the two QCL sets are non-QCL sets. In this embodiment, data may be sent to the terminal device in a same time-domain symbol by using two non-QCL antenna ports.

In the case of the second meaning, although the first network-side device and the second network-side device send data in different time-domain symbols, antenna ports are allocated in advance in this embodiment, and the antenna port in the first antenna port set used by the first network-side device is not completely same as the antenna port in the second antenna port set used by the second network-side device.

Figure 1B:
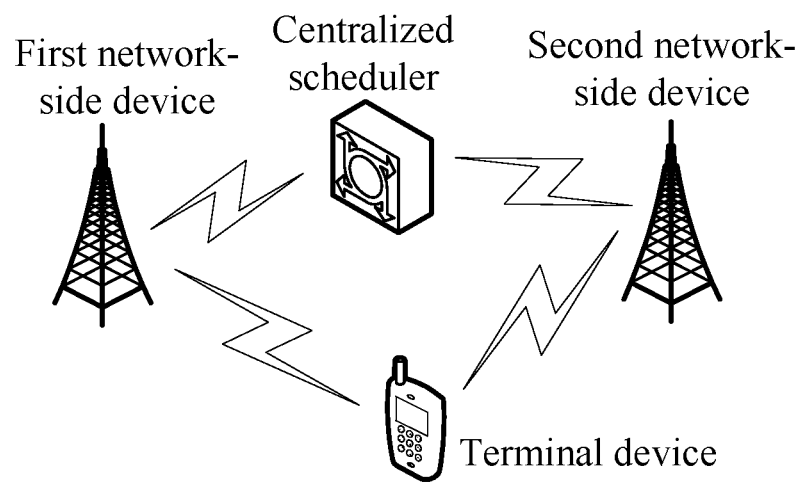

In a structure shown in FIG. 1b that is different from a structure shown in FIG. 1a, both the first network-side device and the second network-side device access a centralized scheduler. The first network-side device and the second network-side device may not directly communicate with each other. The control message and/or the indication information are both delivered by the centralized scheduler to the first network-side device and the second network-side device.

During actual deployment, the centralized scheduler may be a standalone physical device, or may be a functional module integrated into the first network-side device or another device. This is not limited in this specification.

It should be understood that the communications network systems in FIG. 1a and FIG. 1b show only one terminal device and two network-side devices as an example. The communications network system may further include a neighboring network-side device and a terminal device, other than the two network-side devices, that transmit a service on a same time-frequency resource, and a coverage area of each network-side device may further include another quantity of terminal devices. Optionally, the communications network system in which the network-side device and the terminal device in FIG. 1a and the FIG. 1b reside may further include other network entities, such as a network controller and/or a mobility management entity. This is not limited in this embodiment of the present invention.

The network-side device in this application may be a base transceiver station (BTS) in the Global System for Mobile Communications (GSM) or the Code Division Multiple Access (CDMA) system, or a NodeB (NB) in the Wideband Code Division Multiple Access (WCDMA) system, or an evolved NodeB (eNB or eNodeB) in the Long Term Evolution (LTE) system, or a relay station or an access point, or a base station in a future 5G network. This is not limited in this specification.

The terminal device in this application may be a wireless terminal device or a wired terminal device. The wireless terminal device may be a device that provides voice and/or other service data connectivity for a user, a handheld device with a wireless connection function, or another processing device connected to a wireless modem. The wireless terminal device may communicate with one or more core networks by using a radio access network (RAN). The wireless terminal device may be a mobile terminal, such as a mobile phone (or referred to as a "cellular" phone) and a computer with a mobile terminal. For example, the mobile terminal may be a portable, pocket-sized, handheld, computer built-in, or in-vehicle mobile apparatus, and exchanges voice and/or data with the radio access network. For example, the wireless terminal device may be a device such as a personal communication service (PCS) phone, a cordless telephone set, a Session Initiation Protocol (SIP) phone, a wireless local loop (WLL) station, or a personal digital assistant (PDA). The wireless terminal device may also be referred to as a system, a subscriber unit, a subscriber station, a mobile station, a mobile, a remote station, a remote terminal, an access terminal, a user terminal, a user agent, or a user device (User Device or User Equipment).

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Some English abbreviations in this application such as abbreviations in an LTE system are used to describe the embodiments of the present invention, and may vary with evolvement of a network. For specific evolvement, refer to descriptions in corresponding standards.

Figure 2:
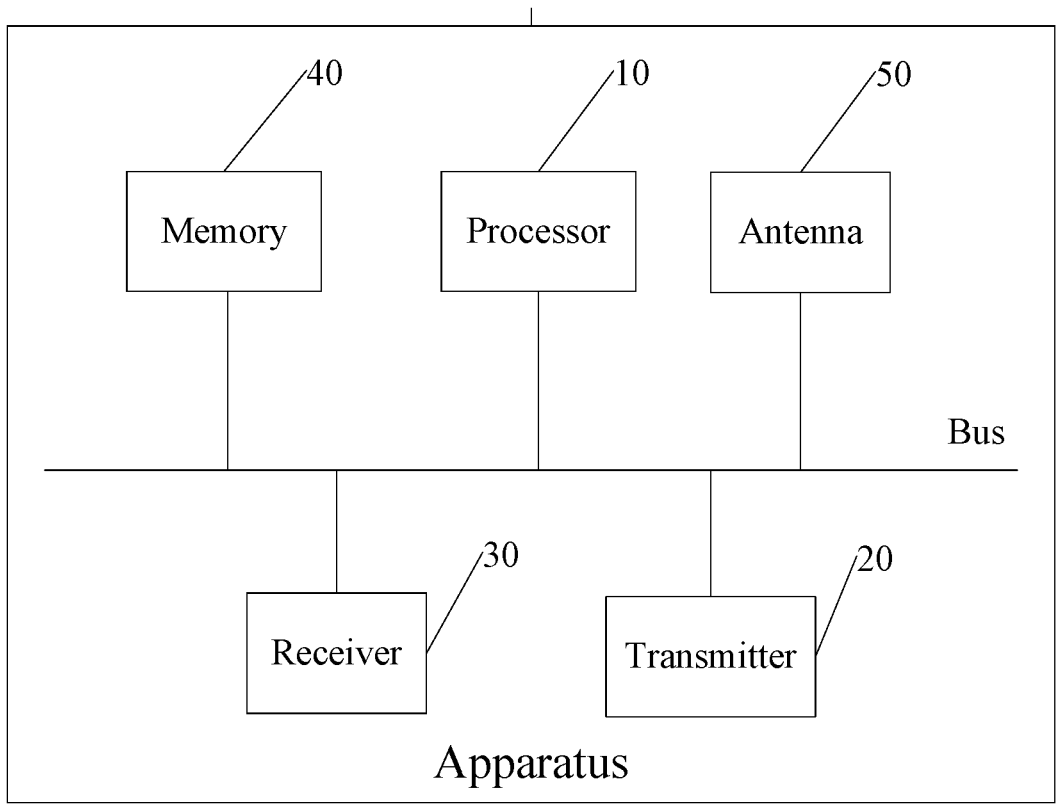
FIG. 2 is a diagram of a structure of an apparatus according to an embodiment of the present invention.

FIG. 2 is a possible diagram of a structure of an apparatus according to an embodiment of the present invention. The apparatus is, for example, of a possible structural diagram of the foregoing first network-side device, second network-side device, and terminal device. As shown in FIG. 2, the apparatus includes a processor 10, a transmitter 20, a receiver 30, a memory 40, and an antenna 50. The memory 40, the transmitter 20, the receiver 30, and the processor 10 may be connected by a bus. Certainly, during actual application, the memory 40, the transmitter 20, the receiver 30, and the processor 10 may not be of a bus structure, but may be of another structure such as a star-shaped structure. This is not specifically limited in this application.

Optionally, the processor 10 may be a general-purpose central processing unit or an application-specific integrated circuit (ASIC), may be one or more integrated circuits configured to control program execution, may be a hardware circuit developed by using a field programmable gate array (FPGA), or may be a baseband processor.

Optionally, the processor 10 may include at least one processing core.

Optionally, the memory 40 may include one or more of a read-only memory (ROM), a random access memory (RAM), and a magnetic disk memory. The memory 40 is configured to store data and/or an instruction that are/is required when the processor 10 runs. There may be one or more memories 40.

Optionally, each antenna port may send a demodulation reference signal (DM-RS), which is used by a terminal device to perform PDSCH channel estimation and PDSCH data demodulation. LTE is used as an example. LTE supports eight antenna ports. The eight antenna ports may be divided into two groups: ports {7, 8, 11, and 13} are in a group, and ports {9, 10, 12, and 14} are in the other group. The two groups of antenna ports are distinguished by frequency division. Four antenna ports in each group are distinguished by code division.

Optionally, the transmitter 20 and the receiver 30 may be physically independent of each other or integrated together. The transmitter 20 may send data by using the antenna 50. The transmitter 30 may receive data by using the antenna 50.

Figure 3:
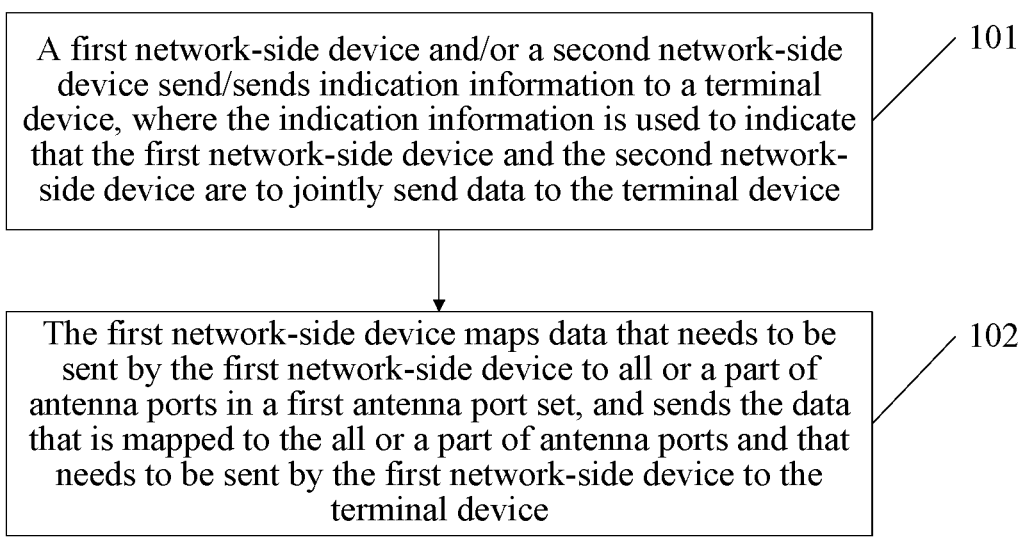
FIG. 3 is a flowchart of a data transmission method on a first network-side device side according to an embodiment of the present invention.

FIG. 3 is a flowchart of a data transmission method on a first network-side device side according to an embodiment of the present invention. As shown in FIG. 3, the method includes the following steps.

Step 101: A first network-side device and/or a second network-side device send/sends indication information to a terminal device, where the indication information is used to indicate that the first network-side device and the second network-side device are to jointly send data to the terminal device.

Step 102: The first network-side device maps data that needs to be sent by the first network-side device to all or a part of antenna ports in a first antenna port set, and sends the data that is mapped to the all or a part of antenna ports and that needs to be sent by the first network-side device to the terminal device, where the antenna ports in the first antenna port set are not completely same as antenna ports in a second antenna port set used by the second network-side device.

Optionally, before step 101, the method further includes: sending, by the first network-side device, an antenna port allocation result to the terminal device, where the antenna port allocation result is used to indicate the first antenna port set and/or the second antenna port set. This method achieves dynamic antenna port allocation and is more flexible.

If the first network-side device sends, to the terminal device, only an allocation result used to indicate the first antenna port set, the second network-side device further sends, to the terminal device, an allocation result used to indicate the second antenna port set.

There may be the following four but not limited to the following four types of manners of obtaining an antenna port allocation result: In a first manner, the first network-side device configures the first antenna port set used by the first network-side device and the second antenna port set used by the second network-side device. This manner is applicable to the communications system shown in FIG. 1a.

For example, the first network-side device is used as a serving base station of the terminal device. When determining that the first network-side device and the second network-side device need to jointly send data to the terminal device, the first network-side device allocates an antenna port set to the first network-side device, and allocates an antenna port set to the second network-side device. An allocation result is that, for example, the first antenna port set is {7, 8, 11, and 13}, and the second antenna port set is {9, 10, 12, 14}.

In a second manner, a centralized scheduler configures the first antenna port set for the first network-side device and the second antenna port set for the second network-side device respectively. This manner is applicable to the communications system shown in FIG. 1b.

For example, when determining that the serving base station and a coordinated base station need to jointly transmit data to the terminal device, the centralized scheduler configures an antenna port set for the serving base station and an antenna port set for the coordinated base station respectively, and notifies the serving base station and the coordinated base station of a port configuration result by using a communication protocol between the centralized scheduler and the base stations.

In a third manner, the first antenna port set and the second antenna port set are preconfigured. This manner is applicable to the communications network systems shown in FIG. 1a and FIG. 1b.

For example, an antenna port set {7, 8, 11, 13} is preconfigured for the serving base station, and an antenna port set {9, 10, 12, 14} is preconfigured for the coordinated base station. When determining that the serving base station and the coordinated base station need to jointly send data to the terminal device, the centralized scheduler sends indication information to the serving base station and the coordinated base station. When receiving the indication information, the serving base station may use the preconfigured antenna port set as an antenna port allocation result. The coordinated base station may also learn about the antenna port set for jointly sending data.

In addition, in the structure shown in FIG. 1a, the first network-side device may further send indication information to the second network-side device, so as to indicate that the second network-side device are to jointly send data to the terminal device. In this case, the second network-side device may send data to the terminal device by using a port in the preconfigured second antenna port set.

In a fourth manner, the first antenna port set may be preconfigured, or may be determined by the first network-side device, or may be allocated by the centralized scheduler. Then, the first network-side device sends notification information to the second network-side device. The notification information is used to notify the second network-side device of the first antenna port set used by the first network-side device. The second network-side device may determine, based on the first antenna port set used by the first network-side device, the antenna port set used by the second network-side device.

Optionally, the notification information includes an antenna port index item. A size of the antenna port index item is N bits. If an $i^{th}$ bit is 0, it indicates that the $i^{th}$ antenna port in the antenna ports supported by the first network-side device is not configured. If the $i^{th}$ bit is 1, it indicates that the $i^{th}$ antenna port in the antenna ports supported by the first network-side device is configured. A value of i is an integer ranging from 0 to N−1, and N is a positive integer. Correspondingly, the second network-side device may parse the antenna port index item to learn about which antenna ports of the first network-side device are configured, and determine, based on the port index item, which antenna ports are to be used by the second network-side device.

For example, in an LTE system, eight antenna ports are ports 7-14. Therefore, a value of N is 8 (i.e., $0^{th}$-$7^{th}$ bits). When the $0^{th}$ bit is 0, it indicates the $0^{th}$ antenna port (i.e., port 7) supported by the first network-side device is not configured.

To ensure configuration accuracy, antenna ports supported by each network-side device are arranged according to an agreed fixed rule. For example, if ports are sorted by antenna port number, the first antenna port is, for example, an antenna port with a smallest antenna port number.

Certainly, during actual application, each bit may be associated with a port number. For example, when the $i^{th}$ bit is 0, it may indicate that a port i+7 is not configured. LTE is also used as an example. If the $0^{th}$ bit is 0, it indicates that the port 7 is not configured. Results obtained in the two manners are the same. A physical meaning of 7 in i+7 is a start port number of antenna ports.

It should be noted that, the allocation result is that the antenna ports in the first antenna port set are not completely same as the antenna ports in the second antenna port set regardless of which one of the foregoing four antenna port allocation manners is used, and regardless of which allocation rule is used. Preferably, the ports in the two sets are all different.

It should be noted that a port allocation action may be performed once before data is sent each time, or may be performed once when a current channel condition meets joint transmission. After allocation is performed, allocation is valid until the channel condition does not meet joint transmission. Then, the action is performed once again when a next channel condition meets joint transmission.

For example, after the first antenna port set is allocated, for example, data is transmitted three times during two consecutive allocation periods, a port in the allocated antenna port set is used. Each time a same port or different ports may be used based on an actual requirement, for example, transmission data is different. When an antenna port set is allocated next time, the antenna port set may be same as or different from the antenna port set allocated last time.

It may be understood that, antenna ports specifically used during the two consecutive allocation periods may be allocated or indicated by using a downlink physical control channel in the Background part. The downlink physical control channel may be a PDCCH channel in an LTE system, or may be a channel with another name that implements a downlink physical control function and emerges as a result of system evolution.

Optionally, the second network-side device is a neighboring network-side device of the first network-side device. For example, the first network-side device is a serving base station, and the second network-side device is a neighboring base station of the serving base station.

Corresponding to the first manner, before step 102, the method further includes: sending, by the first network-side device, notification information to the second network-side device, where the notification information is used to notify the second network-side device of the second antenna port set used by the second network-side device.

Optionally, the notification information includes an antenna port index item. A size of the antenna port index item is N bits. If an $i^{th}$ bit is 0, it indicates that an $i^{th}$ antenna port in the antenna ports supported by the second network-side device is not configured. If the $i^{th}$ bit is 1, it indicates that the $i^{th}$ antenna port in the antenna ports supported by the second network-side device is configured. A value of i is an integer ranging from 0 to N−1, and N is a positive integer. Correspondingly, the second network-side device may parse the antenna port index item to learn about which antenna ports of the second network-side device are configured. The configured ports form the second antenna port set.

During actual application, the notification information may be an individual message, or may be a message formed by adding an antenna port index item to an existing message.

For example, 3GPP specification TS 36.423 defines that a plurality of base stations send inter-cell CoMP transmission information by using an X2 interface. Therefore, an antenna port index item may be added to the CoMP information. Table 1 lists the added antenna port index item.

TABLE 1

| Information element/ Group name | Represent | Information element type and reference | Semantic description |
| --- | --- | --- | --- |
| Port (port) | | | |
| Port index (port index) | O | 8-bit indication | If an $i^{th}$ bit is 0, it indicates that an antenna port i + 7 is not configured; if an $i^{th}$ bit is 1, it indicates that the antenna port i + 7 is configured. |
| Demodulation reference signal scrambling identity (scramblingIdentity) | O | Integer (0 . . . 503) | A scrambling ID of a demodulation reference signal sent by a port in an antenna port set. The ID is an integer ranging from 0 to 503. |

O indicates that the information element (IE) is optional. The scrambling ID of the demodulation reference signal is an initialization parameter when a demodulation reference signal sequence is generated.

When the first network-side device determines to jointly transmit data to the terminal device with the second network-side device or receive a joint transmission indication from the centralized scheduler, the first network-side device may send the antenna port allocation result to the terminal device. The allocation result includes the first antenna port set used by the first network-side device and the second antenna port set used by the second network-side device.

Optionally, the first network-side device may send the antenna port allocation result to the terminal device by using higher layer signaling.

During actual application, the first network-side device may notify the terminal device of the port allocation result by using higher layer signaling different from higher layer signaling in the conventional art, or by reusing the higher layer signaling in the conventional art, for example, radio resource control (RRC) or a media access control control element (MAC CE), for example, a new field that carries the port allocation result is added to the prior-art higher layer signaling.

For example, in the conventional art, the serving base station sends a QCL parameter to the terminal device by using an RRC message. Specifically, the QCL parameter is carried in a PDSCH mapping and QCL configuration information element, and a PDSCH configuration information element is an upper-level information element of the PDSCH mapping and QCL configuration information element. In 3GPP TS 36.331-c60, the PDSCH configuration information element is as follows:

```
-- ASN1START
PDSCH-ConfigCommon ::=     SEQUENCE {
    referenceSignalPower           INTEGER (-60..50),
    p-b                            INTEGER (0..3)
}
PDSCH-ConfigDedicated::=         SEQUENCE {
    p-a                            ENUMERATED {
                                   dB-6,    dB-4dot77,   dB-3,
dB-1dot77,
                                   dB0, dB1, dB2, dB3}
}
PDSCH-ConfigDedicated-v1130 ::=          SEQUENCE {
    dmrs-ConfigPDSCH-r11           DMRS-Config-r11
    OPTIONAL,  -- Need ON
    qcl-Operation                  ENUMERATED {typeA, typeB}
    OPTIONAL,  -- Need OR
    re-MappingQCLConfigToReleaseList-r11
    RE-MappingQCLConfigToReleaseList-r11        OPTIONAL,  -- Need ON
    re-MappingQCLConfigToAddModList-r11
    RE-MappingQCLConfigToAddModList-r11         OPTIONAL  -- Need ON
}
RE-MappingQCLConfigToAddModList-r11 ::=       SEQUENCE   (SIZE
(1..maxRE-MapQCL-r11)) OF PDSCH-RE-MappingQCL-Config-r11
RE-MappingQCLConfigToReleaseList-r11 ::= SEQUENCE         (SIZE
(1..maxRE-MapQCL-r11)) OF PDSCH-RE-MappingQCL-ConfigId-r11
PDSCH-RE-MappingQCL-Config-r11 ::=       SEQUENCE {
    pdsch-RE-MappingQCL-ConfigId-r11
    PDSCH-RE-MappingQCL-ConfigId-r11,
    optionalSetOfFields-r11        SEQUENCE {
        crs-PortsCount-r11             ENUMERATED {n1, n2, n4,
spare1},
        crs-FreqShift-r11              INTEGER (0..5),
        mbsfn-SubframeConfigList-r11   CHOICE {
            release                    NULL,
            setup                      SEQUENCE {
                subframeConfigList
    MBSFN-SubframeConfigList
            }
        }
    OPTIONAL,  -- Need ON
        pdsch-Start-r11                ENUMERATED {reserved, n1,
n2, n3, n4, assigned}
    }
    OPTIONAL,  -- Need OP
    csi-RS-ConfigZPId-r11          CSI-RS-ConfigZPId-r11,
    qcl-CSI-RS-ConfigNZPId-r11     CSI-RS-ConfigNZPId-r11
        OPTIONAL,  -- Need OR
    ...
}
-- ASN1STOP
```

The PDSCH mapping and QCL configuration information element is PDSCH-RE-MappingQCL-Config-r11. The information element carries PDSCH resource mapping information (for example, one or more of a cell-level reference signal (CRS) port information, CRS frequency offset information, mbsfn subframe configuration information, PDSCH start location information), and carries QCL configuration information (for example, one or more of non-zero power channel state information reference signal (CSI-RS) configuration information). In this embodiment, an antenna port allocation field may be added to the PDSCH mapping and QCL configuration information element. A format of the port allocation field is as follows:
Demodulation reference signal-PortIndex BIT STRING (SIZE(8))
scramblingIdentity INTEGER (0 . . . 503)

The demodulation reference signal-PortIndex indicates that antenna port information in the group of QCL parameters includes eight bits. If an $i^{th}$ bit is 0, it indicates that a port 7+i does not exist; if the $i^{th}$ bit is 1, it indicates that the port 7+i exists. scramblingIdentity indicates a scrambling ID, which is an integer ranging from 0 to 503. The upper-level information element of the PDSCH mapping and QCL configuration information element, that is, the PDSCH configuration information element, includes a DMRS-Config-r11 (the italic part in the foregoing code) field, and the field also includes a scrambling ID, that is, scramblingIdentity. Therefore, to be compatible with existing PDSCH information element configuration in the protocol, the added antenna port allocation field in the PDSCH mapping and QCL configuration information element may take effect only in a transmission mode 10 or a newly defined transmission mode. The newly defined transmission mode is a transmission mode corresponding to this embodiment.

Another example of sending the antenna port allocation result by using the higher layer information to the terminal device in this embodiment is adding the antenna port allocation field to the PDSCH configuration information element. The format of the antenna port allocation field is not limited, including an antenna port set number and/or antenna port information corresponding to each antenna port set. Different antenna port set numbers correspond to different antenna port sets. Optionally, antenna port information included in an antenna port set may be implicitly obtained by using an antenna port set number according to a mapping relationship between an antenna port set and an antenna port.

The first network-side device notifies the terminal device of the first antenna port set and the second antenna port set, so that when receiving the data separately sent by the first network-side device and the second network-side device, the terminal device demodulates, by using a demodulation reference signal corresponding to a port in the first antenna port set, the data sent by the first network-side device, and demodulates, by using a demodulation reference signal corresponding to a port in the second antenna port set, the data sent by the second network-side device.

It should be noted that in a possible solution, the first antenna port set and/or the second antenna port set may be specified in the protocol (that is, separately preconfigured by the network-side device and the terminal device). In this case, the first network-side device may not send a port allocation result specified in the corresponding protocol to the terminal device.

In another aspect, when the first network-side device determines to jointly transmit data to the terminal device with the second network-side device or receive a joint transmission indication from the centralized scheduler, the first network-side device may perform step 101, that is, send the indication information to the terminal device. The indication information is used to indicate that the first network-side device and the second network-side device are to jointly send data to the terminal device. Correspondingly, when receiving the indication information, the terminal device may learn that the first network-side device and the second network-side device are to jointly send data to the terminal device. When receiving the data from the first network-side device and the second network-side device, the terminal device may use the demodulation reference signal corresponding to the port in the port set of the first network-side device and the demodulation reference signal corresponding to the port in the port set of the second network-side device to perform data demodulation.

Optionally, the first network-side device and/or the second network-side device send/sends the indication information to the terminal device by using physical layer signaling.

During actual application, the first network-side device and/or the second network-side device may send the indication information to the terminal device by using separate signaling or messages, or may expand or reuse signaling or messages in the conventional art to form new indication information. For example, the indication information may be sent by using a downlink physical control channel. The downlink physical control channel may be a PDCCH in an LTE system, or may be a channel with another name that implements a corresponding downlink physical control function in a future network. For a specific function and evolution, refer to descriptions in a corresponding standard.

For example, referring to Table 2, Table 2 lists meanings of a PQI field in a downlink PDCCH format 2D in LTE (referring to 3GPP TS 36.213-c50).

TABLE 2

| PQI field value | Description |
| --- | --- |
| '00' | A parameter group 1 configured by using higher layer signaling |
| '01' | A parameter group 2 configured by using higher layer signaling |
| '10' | A parameter group 3 configured by using higher layer signaling |
| '11' | A parameter group 4 configured by using higher layer signaling |

Any combination of two bits in the PQI field corresponds to a group of QCL parameter configuration and PDSCH resource mapping configuration. Each group of QCL parameter and PDSCH resource mapping configuration is configured by using a PDSCH mapping and QCL configuration information element in RRC signaling.

In the conventional art, a PQI field value has only two bits. Only one group of QCL parameter can be indicated at a time. Therefore, each time only one network-side device, for example, the first network-side device or the second network-side device, transmits data to the terminal device.

In this embodiment, the PQI field value in the conventional art is expanded to more bits, so that a system supports indication of more than one group of QCL parameter at the same time. Table 3 lists meanings of indication when the PQI field value is expanded to four bits. It should be noted that Table 3 is only for reference. During actual application, the table may be designed according to a requirement.

TABLE 3

| PQI field value | Description |
| --- | --- |
| '0000' | A parameter group 1 configured by using higher layer signaling |
| '0001' | A parameter group 2 configured by using higher layer signaling |
| '0010' | A parameter group 3 configured by using higher layer signaling |
| '0011' | A parameter group 4 configured by using higher layer signaling |
| '0100' | Parameter groups 1 and 2 configured by using higher layer signaling |
| '0101' | Parameter groups 2 and 3 configured by using higher layer signaling |
| '0110' | Parameter groups 3 and 4 confimred by using higher layer signaling |
| '0111' | Parameter groups 1 and 4 confimred by using higher layer signaling |
| '1000' | Parameter groups 1 and 3 configured by using higher layer signaling |
| '1001' | Parameter groups 2 and 4 configured by using higher layer signaling |
| '1010' | Parameter groups 1, 2, and 3 configured by using higher layer signaling |
| '1011' | Parameter groups 2, 3, and 4 configured by using higher layer signaling |
| '1100' | Parameter groups 1, 2, and 4 configured by using higher layer signaling |
| '1101' | Parameter groups 1, 3, and 4 configured by using higher layer signaling |
| '1110' | Parameter groups 1, 2, 3, and 4 confimred by using higher layer signaling |
| '1111' | Reserved |

Therefore, when sending an expanded PQI, the first network-side device fills corresponding bit values in the PQI field value, for example, 0100. In LTE, one group of QCL parameter corresponds to one network-side device. In this case, when parsing the PQI field value, the terminal device may learn about QCL parameter groups 1 and 2, and also learn that a network-side device corresponding to the QCL parameter group 1 and a network-side device corresponding to the QCL parameter group 2 are to jointly transmit data to the terminal device. For another example, the PQI field value is 1010. In this case, when parsing the PQI field value, the terminal device may learn about QCL parameter groups 1, 2 and 3, and also learn that a network-side device corresponding to the QCL parameter group 1, a network-side device corresponding to the QCL parameter group 2, and a network-side device corresponding to the QCL parameter group 3 are to jointly transmit data to the terminal device. Optionally, the terminal device may determine, by using cell configuration information included in the QCL parameter group, whether each parameter group corresponds to the first network-side device or the second network-side device. For example, the QCL parameter group 1 corresponds to configuration of a current cell (for example, one or more of a CRS port, a frequency shift, and CSI-RS configuration), and the terminal device can learn that the QCL parameter group 1 corresponds to the first network-side device. The QCL parameter groups 2 to 4 (if any) correspond to configuration of another cell. Therefore, it can be learned that the QCL parameter groups 2 to 4 correspond to the second network-side device.

It can be learned from Table 3 that the solution in this embodiment is also compatible with a solution in which the PQI indicates one group of QCL parameter. That is, if the solution in this embodiment is used, the first network-side device or the second network-side device may separately transmit data to the terminal device, or the first network-side device and the second network-side device may jointly transmit data to the terminal device, as long as the first network-side device gives an indication by using different PQI field values.

Optionally, the first network-side device and the second network-side device may send the indication information to the terminal device. The indication information is used to implicitly indicate that the first network-side device and the second network-side device are to jointly send data to the terminal device. For example, the indication information may be sent by using a downlink physical control channel. The downlink physical control channel may be a PDCCH in an LTE system, or may be a channel with another name that implements a corresponding downlink physical control function in a future network. For a specific function and evolution, refer to descriptions in a corresponding standard. The indication information includes QCL information of a transmit antenna port of a network-side device (for example, a PQI field in a physical layer control message in an existing standard). When the terminal device receives n types of signaling or messages, where n is an integer greater than or equal to 2, and different signaling or messages include different QCL information of antenna ports, the terminal device may implicitly learn that currently n network-side devices jointly are to send data to the terminal device. It should be noted that, before the first network-side device sends first indication information to the terminal device and the second network-side device sends second indication information to the terminal device, the first network device may send configuration information to the terminal device, so as to instruct the terminal device to receive n pieces of the indication information including QCL information (for example, a PQI field in a physical layer control message in an existing standard) of a transmit antenna port of a network-side device.

Optionally, the first network-side device sends the first indication information to the terminal device, and the second network-side device sends the second indication information to the terminal device. The first indication information is used to indicate antenna port information of the first antenna port set used by the first network-side device and QCL information corresponding to the antenna port information.

The second indication information is used to indicate antenna port information of the second antenna port set used by the second network-side device and QCL information corresponding to the antenna port information. The first indication information and the second indication information may allow the terminal device to implicitly determine that the first network-side device and the second indication information are to perform joint transmission to the terminal device. The first indication information and the second indication information required for this implicit indication may alternatively correspond to the indication information sent to the terminal device in step 101. It should be noted that, before the first network-side device sends the first indication information to the terminal device and the second network-side device sends the second indication information to the terminal device, the first network-side device may send configuration information to the terminal device, so as to instruct the terminal device to receive more than one piece of the indication information used to indicate antenna port information of an antenna port set used by a network-side device and QCL information corresponding to the antenna port information.

It should be noted that, for the communications system shown in FIG. 1*a*, the first network-side device may further send indication information to the second network-side device, so as to instruct the second network-side device to perform joint transmission. For the communications system shown in FIG. 1*b*, the first network-side device may not send such indication information to the second network-side device, because the centralized scheduler may give a direct indication.

Next, the first network-side device performs step 102, that is, the first network-side device sends data that needs to be sent by the first network-side device in the jointly-transmitted data to the terminal device by using an antenna port (all or a part of ports, for example, determined according to the transmitted data) in the first antenna port set.

Specifically, in LTE, a process of processing a downlink physical shared channel includes: independent scrambling for each code word, modulation, layer mapping, precoding, resource element RE mapping, and orthogonal frequency division multiplexing (OFDM) symbol generation. In this embodiment, a plurality of non-quasi-colocation network-side devices may jointly send data to a single terminal device, and signals from the non-QCL network-side devices correspond to different antenna ports. In step 101, the first network-side device has sent an antenna port allocation result to the terminal device. Correspondingly, during actual physical channel processing, a layer mapping part (including port mapping) needs to be modified correspondingly.

For example, for multi-stream transmission, the first network-side device maps a part of a plurality of code words of the data that needs to be jointly transmitted to the antenna ports in the first antenna port set, and sends the part of code words mapped to the antenna ports in the first antenna port set. For example, if the PQI indicates two groups of QCL parameters, the first antenna port set is {7, 8}, and the second antenna port set is {9, 10}, the first network-side device maps a code word 0 to a port 7 or 8, and sends the code word 0 mapped to the port 7 or 8; maps a code word 1 to a port 9 or 10 in the second antenna port set, and sends the code word 1 mapped to the port 9 or 10.

For another example, for diversity transmission, the first network-side device maps a signal of diversity transmitted signals to the antenna ports in the first antenna port set, and sends the signal mapped to the antenna ports.

For example, if the serving base station and the coordinated base station jointly perform space frequency block coding (SFBC) sending, the serving base station uses a QCL parameter for the serving base station to configure one port (for example, the port 7) in the first antenna set to send a signal of SFBC, and the coordinated base station uses a QCL parameter for the coordinated base station to configure one port (for example, the port 9) in the second antenna port set to send another signal of SFBC.

It should be noted that, the data that needs to be separately sent by the first network-side device and the second network-side device may be predefined in a protocol. For example, the first network-side device sends the code word 0 and the second network-side device sends the code word 1, or vice versa.

Therefore, the data transmitted by the first network-side device and the second network-side device in a same time-domain symbol may be a same code word, or may be different independent code words.

In addition, which port in the antenna port set is used for code word mapping may also be determined according to an agreed rule. For example, a port is selected according to a number order of ports in the port set. The first port is selected for one layer and the first two ports are selected for two layers.

Certainly, during actual application, the first network-side device and/or the second network-side device may notify the terminal device of a port number of a port to which the code word is mapped. A specific notification method is not limited in this embodiment of the present invention.

For example, antenna port set information and/or antenna port number information used when the first network-side device and the second network-side device transmits data may be explicitly notified to the terminal device by using a physical layer message or a MAC CE. Based on the antenna port set information and/or the antenna port number information, and antenna port set information indicated by the expanded PQI, the terminal device may obtain antenna port information used by the first network-side device and the second network-side device and QCL information corresponding to the antenna port information during current transmission. An explicit notification message such as the physical layer message or the MAC CE may be sent by the first network-side device and/or the second network-side device to the terminal device.

For another example, the antenna port set information and/or antenna port information used when the first network-side device and the second network-side device transmits data may be notified to the terminal device by using a physical layer message or a MAC CE. The used antenna port information may be implicitly obtained by using indicated layer information and a layer-to-port mapping relationship, or the antenna port information may be explicitly indicated. QCL information corresponding to each piece of antenna port set information and/or used antenna port information is separately indicated. Each QCL information indication field may be same as a PQI information field in a current LTE system. A notification message such as the physical layer message or the MAC CE may be sent by the first network-side device and/or the second network-side device to the terminal device.

For the second network-side device, the executed data transmission method includes the following steps: obtaining, by the second network-side device, a coordination indication, where the coordination indication is used to instruct the second network-side device to send data to the terminal device in a same time-domain symbol; obtaining, by the second network-side device, a pre-obtained second antenna port set, where the second antenna port set includes at least one antenna port; and mapping, by the second network-side device, data that needs to be sent by the second network-side device to antenna ports in the second antenna port set, and sending the data that is mapped to the antenna ports and that needs to be sent by the second network-side device.

The coordination indication obtained by the second network-side device may be sent by the first network-side device or directly indicated by the centralized scheduler.

For details about a manner of pre-obtaining the second antenna port set, refer to descriptions of the foregoing first to fourth manners, that is, may be indicated by the centralized scheduler, or may be indicated by the first network-side device, or may be preconfigured, or may be determined by the second network-side device based on the first antenna port.

A specific manner of sending data by the second network-side device is same as that of the first network-side device, and has been described above in detail. Therefore, details are not described herein again.

For the terminal device, the data transmission method includes the following steps: receiving, by the terminal device, indication information sent by the first network-side device and/or the second network-side device, where the indication information is used to indicate that the first network-side device and the second network-side device are to send data to the terminal device in a same time-domain symbol; and receiving, by the terminal device according to the indication information, a first part of data sent by the first network-side device and a second part of data sent by the second network-side device.

Optionally, the terminal device performs channel estimation based on a first demodulation reference signal that is sent on a pre-obtained first antenna port used by the first network-side device to send the first part of data, and demodulates the first part of data based on a channel estimation result; and performs channel estimation based on a second demodulation reference signal that is sent on a pre-obtained second antenna port used by the second network-side device to send the second part of data, and demodulates the second part of data based on a channel estimation result. The first antenna port and the second antenna port are different.

The indication information has been described above, and details are not described herein again.

Optionally, during multi-point multi-stream transmission, the first part of data and the second part of data may be unrelated independent code words. An independent code word corresponds to an independent modulation and coding scheme (MCS). During transmit diversity transmission, a same code word transmitted by two network-side devices corresponds to a same MCS.

Optionally, the pre-obtained first antenna port and the pre-obtained second antenna port may be respectively notified by the first network-side device and the second network-side device, or may be an antenna port allocation result received by the terminal device from the first network-side device. The antenna port allocation result includes the first antenna port set used by the first network-side device and the second antenna port set used by the second network-side device. The terminal device may learn about, according to an agreed rule, which port in the first antenna port set is the first antenna port, and which port in the second antenna port set is the second antenna port.

Further, the terminal device determines, based on a correspondence between an antenna port and a demodulation reference signal, the first demodulation reference signal corresponding to the first antenna port and the second demodulation reference signal corresponding to the second antenna port.

Performing channel estimation based on the demodulation reference signal and performing data demodulation based on the channel estimation result are well-known to persons skilled in the art, and details are not described herein again.

It can be learned from the above that in the solution in this embodiment of the present invention, the first network-side device uses the first antenna port set, the second network-side device uses the second antenna port set, and further the first network-side device sends, to the terminal device and/or the second network-side device, the indication information that is used to indicate joint transmission, so that the terminal device can correctly perform data demodulation. Therefore, the solution in this embodiment of the present invention may support the first network-side device and the second network-side device that are not in QCL in jointly transmitting data to the terminal device.

Based on the solution in which the first network-side device and the second network-side device respectively send the indication information to the terminal device, an embodiment of the present invention further provides a data transmission method, including the following steps:

receiving, by a terminal device, first indication information sent by a first network-side device and second indication information sent by a second network-side device, where the first indication information is used to indicate antenna port information of a first antenna port set used by the first network-side device and QCL information corresponding to the antenna port information; the second indication information is used to indicate antenna port information of a second antenna port set used by the second network-side device and QCL information corresponding to the antenna port information; and antenna ports in the first antenna port set are not completely same as antenna ports in the second antenna port set; and receiving, by the terminal device based on the antenna port information of the first antenna port set and the QCL information corresponding to the antenna port information, and the antenna port information of the second antenna port set and the QCL information corresponding to the antenna port information, a first part of data sent by the first network-side device and a second part of data sent by the second network-side device.

The first indication information and the second indication information have been described above, and details are not described herein again.

Optionally, the terminal device performs channel estimation based on a first demodulation reference signal that is sent by a pre-obtained first antenna port used by the first network-side device to send the first part of data, and demodulates the first part of data based on a channel estimation result; and performs channel estimation based on a second demodulation reference signal that is sent by a pre-obtained second antenna port used by the second network-side device to send the second part of data, and demodulates the second part of data based on a channel estimation result. The first antenna port and the second antenna port are different, the first antenna port is all or a part of the antenna ports in the first antenna port set, and the second antenna port is all or a part of the antenna ports in the second antenna port set.

Optionally, the terminal device determines, based on a correspondence between an antenna port and a demodulation reference signal, the first demodulation reference signal corresponding to the first antenna port and the second demodulation reference signal corresponding to the second antenna port.

Performing channel estimation based on the demodulation reference signal and performing data demodulation based on the channel estimation result are well-known to persons skilled in the art, and details are not described herein again.

Based on a same inventive concept, an embodiment of the present invention further provides an apparatus (as shown in FIG. 2). The apparatus is configured to implement any one of the foregoing methods.

When the apparatus is a network-side device, for example, the foregoing first network-side device, a processor 10 is configured to obtain indication information and map data that needs to be sent by the network-side device to antenna ports in a first antenna port set, where the indication information is used to indicate that the network-side device and a second network-side device are to jointly send data to a terminal device. A transmitter 20 is configured to send the indication information to the terminal device, and send, to the terminal device, the data that is mapped to the antenna ports and that needs to be sent by the network-side device. The antenna ports in the first antenna port set are not completely same as antenna ports in a second antenna port set used by the second network-side device.

Optionally, the transmitter 20 is further configured to: before sending the indication information to the terminal device, send an antenna port allocation result to the terminal device. The antenna port allocation result is used to indicate the first antenna port set and/or the second antenna port set.

Optionally, the transmitter 20 is further configured to send notification information to the second network-side device. The notification information is used to notify the second network-side device of the second antenna port set used by the second network-side device or the first antenna port set.

Optionally, the notification information includes an antenna port index item, and a size of the antenna port index item is N bits. If an $i^{th}$ bit is 0, it indicates that an $i^{th}$ antenna port in antenna ports supported by the second network-side device or the network-side device is not configured. If the $i^{th}$ bit is 1, it indicates that the $i^{th}$ antenna port in the antenna ports supported by the second network-side device or the network-side device is configured; a value of i is an integer ranging from 0 to N−1, and N is a positive integer.

Optionally, the transmitter 20 is configured to send the antenna port allocation result to the terminal device by using higher layer signaling.

Optionally, the transmitter 20 is configured to send the antenna port allocation result to the terminal device by using a physical downlink shared channel mapping and QCL configuration information element in the higher layer signaling.

Optionally, the indication information includes a PQI, and a field value of the PQI is represented by bits whose quantity is greater than 2.

Optionally, the processor 10 is configured to map a part of a plurality of code words of the data that needs to be jointly transmitted to the antenna ports in the first antenna port set, and the transmitter 20 sends the part of code words mapped to the antenna ports in the first antenna port set; or the processor 10 is configured to map a signal of diversity transmitted signals to the antenna ports in the first antenna port set, and the transmitter 20 sends the signal mapped to the antenna ports.

Optionally, the antenna ports in the first antenna port set and the second antenna port set are further configured to transmit demodulation reference signals, and transmit a demodulation reference signal used for demodulating data by using a port that the data to be demodulated is on.

When the apparatus is another network-side device, for example, the foregoing second network-side device, a receiver 30 is configured to receive a coordination indication, where the coordination indication is used to indicate that the network-side device and a first network-side device are to jointly send data to a terminal device. A processor 10 is configured to map data that needs to be sent by the network-side device to antenna ports in a second antenna port set, where the second antenna port set includes at least one antenna port, and the at least one antenna port is not completely same as an antenna port in a first antenna port set used by the first network-side device. A transmitter 20 is configured to send, to the terminal device, the data that is mapped to the antenna ports and that needs to be sent by the network-side device.

Optionally, the processor 10 is configured to receive the second antenna port set from the first network-side device by using the receiver 30.

When the apparatus is a terminal device, a receiver 30 is configured to receive indication information sent by a first network-side device, where the indication information is used to indicate that the first network-side device and a second network-side device are to jointly send data to the terminal device, and the first network-side device is a network-side device accessed by the terminal device; and receive a first part of data sent by the first network-side device and a second part of data sent by the second network-side device. A processor 10 is configured to receive the first part of data and the second part of data according to the indication information.

Optionally, the processor 10 is further configured to perform channel estimation based on a first demodulation reference signal that is sent by a pre-obtained first antenna port used by the first network-side device to send the first part of data, and demodulate the first part of data based on a channel estimation result; and perform channel estimation based on a second demodulation reference signal that is sent by a pre-obtained second antenna port used by the second network-side device to send the second part of data, and demodulate the second part of data based on a channel estimation result. The first antenna port and the second antenna port are different.

Optionally, the receiver 30 is further configured to receive an antenna port allocation result sent by the first network-side device, where the antenna port allocation result includes a first antenna port set used by the first network-side device and a second antenna port set used by the second network-side device; antenna ports in the first antenna port set are not completely same as antenna ports in the second antenna port set; and the first antenna port is an antenna port in the first antenna port set, and the second antenna port is an antenna port in the second antenna port set. The processor 10 is configured to determine, based on a correspondence between an antenna port and a demodulation reference signal, the first demodulation reference signal corresponding to the first antenna port and the second demodulation reference signal corresponding to the second antenna port.

When the apparatus is a terminal device, a receiver 30 is configured to receive first indication information sent by a first network-side device and second indication information sent by a second network-side device, where the first indication information is used to indicate antenna port information of a first antenna port set used by the first network-side device and QCL information corresponding to the antenna port information; the second indication information is used to indicate antenna port information of a second antenna port set used by the second network-side device and QCL information corresponding to the antenna port information; and antenna ports in the first antenna port set are not completely same as antenna ports in the second antenna port set. A processor 10 is configured to receive, based on the antenna port information of the first antenna port set and the QCL information corresponding to the antenna port information, and the antenna port information of the second antenna port set and the QCL information corresponding to the antenna port information, a first part of data sent by the first network-side device and a second part of data sent by the second network-side device.

Optionally, the processor 10 is further configured to perform channel estimation based on a first demodulation reference signal that is sent by a pre-obtained first antenna port used by the first network-side device to send the first part of data, and demodulate the first part of data based on a channel estimation result; and perform channel estimation based on a second demodulation reference signal that is sent by a pre-obtained second antenna port used by the second network-side device to send the second part of data, and demodulate the second part of data based on a channel estimation result. The first antenna port and the second antenna port are different, the first antenna port is all or a part of the antenna ports in the first antenna port set, and the second antenna port is all or a part of the antenna ports in the second antenna port set.

Optionally, the processor 10 is further configured to determine, based on a correspondence between an antenna port and a demodulation reference signal, the first demodulation reference signal corresponding to the first antenna port and the second demodulation reference signal corresponding to the second antenna port.

An embodiment of the present invention further provides a data transmission apparatus. The data transmission apparatus includes a function module configured to execute the foregoing method steps.

Various variations and specific examples in the data transmission method in the foregoing embodiments are also applicable to the data transmission apparatus in this embodiment and the apparatus in FIG. 2. Therefore, for brevity of this specification, details are not described herein again.

A person skilled in the art should understand that the embodiments of the present invention may be provided as a method, a system, or a computer program product. Therefore, the present application may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A data transmission method comprising:
   obtaining, by a terminal device, an antenna port allocation result from one or more of first and second network-side devices, indicating a first antenna port set of the first network-side device and a second antenna port set of the second network-side device,
     wherein an antenna port in the first antenna port set is quasi co-located (QCL) with at least another antenna port in the first antenna port set,
     wherein at least one antenna port in the first antenna port set and at least one antenna port in the second antenna port set do not satisfy QCL,
     wherein an antenna port in the second antenna port set is QCL with at least another antenna port in the second antenna port set,
     wherein the antenna ports in the first antenna port set are not completely the same as the antenna ports in the second antenna port set, and
     wherein QCL antenna ports share values of one or more large-scale fading parameters; and
   receiving, by the terminal device, indication information from the first network side device on a physical downlink control channel,
     wherein the indication information indicates to the terminal device to receive data from the first and second network-side devices, and
     wherein the indication information further indicates receiving a first part of the data on a first antenna port of the first antenna port set and a second part of the data on a second antenna port of the second antenna port set, and
   jointly receiving, by the terminal device and according to the indication information the first and second parts of the data transmitted on the first antenna port in the first antenna port set and on the second antenna port in the second antenna port set, respectively.

2. The method according to claim 1, wherein any one of the antenna ports in the first antenna port set is different from the antenna ports in the second antenna port set.

3. The method according to claim 1, wherein the first antenna port in the first antenna port set is associated with a first demodulation reference signal and the second antenna port in the second antenna port set is associated with a second demodulation reference signal.

4. The method according to claim 1, further comprising:
   performing, by the terminal device, a first channel estimation based on a first demodulation reference signal sent on the same antenna port as the first part of the data, and demodulating the first part of the data based on the first channel estimation; and
   performing a second channel estimation based on a second demodulation reference signal sent on the same antenna port as the second part of the data, and demodulating the second part of the data based on the second channel estimation.

5. The method according to claim 1, wherein the antenna ports in each of the first and second antenna port sets are distinguished by code division and the first and second antenna port sets are distinguishable by frequency division.

6. The method according to claim 1, wherein the antenna port allocation result is carried in higher layer signaling.

7. The method according to claim 6, wherein the antenna port allocation result is carried in a physical downlink shared channel mapping and QCL configuration information element in the higher layer signaling.

8. The method according to claim 1, wherein the first and second parts of the data are the same or different code words.

9. An apparatus comprising:
   a processor coupled to a non-transitory readable storage medium; and
   the non-transitory readable storage medium having computer-readable instructions stored thereon which, when executed by the processor, cause the apparatus to perform:
     obtaining an antenna port allocation result from one or more of first and second network-side devices, indicating a first antenna port set of the first network-side device and a second antenna port set of the second network-side device,
       wherein an antenna port in the first antenna port set is quasi co-located (QCL) with at least another antenna port in the first antenna port set,
       wherein at least one antenna port in the first antenna port set and at least one antenna port in the second antenna port set do not satisfy QCL,
       wherein an antenna port in the second antenna port is QCL with at least another antenna port in the second antenna port set, and
       wherein the antenna ports in the first antenna port set are not completely the same as the antenna ports in the second antenna port set, and
       wherein QCL antenna ports share values of one or more large-scale fading parameters; and
     receiving indication information from the first network side device on a physical downlink control channel,
       wherein the indication information indicates to the apparatus to receive data from the first and second network-side devices, and
       wherein the indication information further indicates receiving a first part of the data on a first antenna port of the first antenna port set and a second part of the data on a second antenna port of the second antenna port set, and jointly receiving, according to the indication information, the first and second parts of the data transmitted on the first antenna port in the first antenna port set and on the second antenna port in the second antenna port set, respectively.

10. The apparatus according to claim 9, wherein any one of the antenna ports in the first antenna port set is different from the antenna ports in the second antenna port set.

11. The apparatus according to claim 9, wherein the antenna port in the first antenna port set is associated with a first demodulation reference signal and the antenna port in the second antenna port set is associated with a second demodulation reference signal.

12. The apparatus according to claim 9, wherein the computer-readable instructions further cause the apparatus to perform:

performing a first channel estimation based on a first demodulation reference signal sent on the same antenna port as the first part of the data, and demodulating the first part of the data based on the first channel estimation; and performing a second channel estimation based on a second demodulation reference signal sent on the same antenna port as the second part of the data, and demodulating the second part of the data based on the second channel estimation.

13. The apparatus according to claim 9, wherein the antenna ports in each of the first and second antenna port sets are distinguished by code division and the first and second antenna port sets are distinguishable by frequency division.

14. A non-transitory readable storage medium, storing a program that, when executed by a processor, causes the processor to provide at least the following operations:

obtaining an antenna port allocation result from one or more of first and second network-side devices, indicating a first antenna port set of the first network-side device and a second antenna port set of the second network-side device, wherein an antenna port in the first antenna port set is quasi co-located (QCL) with at least another antenna port in the first antenna port set, wherein at least one antenna port in the first antenna port set and at least one antenna port in the second antenna port set do not satisfy QCL, wherein an antenna port in the second antenna port is QCL with at least another antenna port in the second antenna port set, wherein the antenna ports in the first antenna port set are not completely the same as the antenna ports in the second antenna port set, and wherein QCL antenna ports share values of one or more large-scale fading parameters; and receiving indication information from the first network side device on a physical downlink control channel, wherein the indication information indicates to the processor to receive data from the first and second network-side devices, and wherein the indication information further indicates receiving a first part of the data on a first antenna port of the first antenna port set and a second part of the data on a second antenna port of the second antenna port set, and cooperating with a receiver to jointly receive, according to the indication information, the first and second parts of the data transmitted on an antenna port in the first antenna port set and on an antenna port in the second antenna port set, respectively.

15. The non-transitory readable storage medium according to claim 14, wherein the antenna port in the first antenna port set is associated with a first demodulation reference signal and the antenna port in the second antenna port set is associated with a second demodulation reference signal.

16. The non-transitory readable storage medium according to claim 14, wherein any one of the antenna ports in the first antenna port set is different from the antenna ports in the second antenna port set.

17. The non-transitory readable storage medium according to claim 14, wherein the program further causes the apparatus to provide at least the following operations:

performing a first channel estimation based on a first demodulation reference signal sent on the same antenna port as the first part of the data, and demodulating the first part of the data based on the first channel estimation; and performing a second channel estimation based on a second demodulation reference signal sent on the same antenna port as the second part of the data, and demodulating the second part of the data based on the second channel estimation.

18. The non-transitory readable storage medium according to claim 14, wherein the antenna ports in each of the first and second antenna port sets are distinguished by code division and the first and second antenna port sets are distinguishable by frequency division.

* * * * *

UNITED STATES PATENT AND TRADEMARK OFFICE
CERTIFICATE OF CORRECTION

PATENT NO. : 10,972,171 B2
APPLICATION NO. : 16/148759
DATED : April 6, 2021
INVENTOR(S) : Ren et al.

Page 1 of 1

It is certified that error appears in the above-identified patent and that said Letters Patent is hereby corrected as shown below:

In the Claims

Claim 1: Column 29, Line 66: "the indication information the first and second parts of" should read -- the indication information, the first and second parts of --.

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*